(12) United States Patent
Morimoto et al.

(10) Patent No.: US 7,952,627 B2
(45) Date of Patent: May 31, 2011

(54) SOLID-STATE IMAGE CAPTURING APPARATUS AND ELECTRIC INFORMATION DEVICE

(75) Inventors: Hidenori Morimoto, Nara (JP); Nobuaki Matsuoka, Hiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 384 days.

(21) Appl. No.: 12/156,194

(22) Filed: May 30, 2008

(65) Prior Publication Data
US 2008/0303929 A1 Dec. 11, 2008

(30) Foreign Application Priority Data

Jun. 1, 2007 (JP) ................................ 2007-147509

(51) Int. Cl.
*H04N 3/14* (2006.01)
*H04N 5/335* (2011.01)
(52) U.S. Cl. ........ 348/294; 348/297; 348/300; 348/301; 348/302; 348/308
(58) Field of Classification Search .................. 348/294, 348/297, 300, 301, 302, 308, 312; 250/208.1; 257/290–292
See application file for complete search history.

(56) References Cited

U.S. PATENT DOCUMENTS

| 7,663,681 | B2 * | 2/2010 | Lee et al. ...................... 348/308 |
| 2006/0208163 | A1 * | 9/2006 | Manabe et al. ............ 250/208.1 |
| 2007/0103574 | A1 * | 5/2007 | Tanaka .......................... 348/308 |

FOREIGN PATENT DOCUMENTS

| CN | 1972386 | 5/2007 |
| EP | 1 475 962 | 11/2004 |
| JP | 2005-086595 | 3/2005 |
| JP | 2005-094240 | 4/2005 |
| JP | 2007-124344 | 5/2007 |
| WO | 03/069897 | 8/2003 |

* cited by examiner

*Primary Examiner* — Yogesh K Aggarwal
(74) *Attorney, Agent, or Firm* — David G. Conlin; Steven M. Jensen; Edwards Angell Palmer & Dodge LLP (57) ABSTRACT

A solid-state image capturing apparatus is provided, and, in a pixel of a 3TR structure, the solid-state image capturing apparatus increases the reset electric potential of the signal charge accumulation section upon a reset operation so that an electric potential difference between the signal voltage and the reset voltage upon transferring of a signal charge is sufficiently secured, a complete transferring of the signal charge is easily performed from the photoelectric conversion element to the signal charge accumulation section, and a stable condition is provided.

21 Claims, 8 Drawing Sheets

SOLID-STATE IMAGE CAPTURING APPARATUS AND ELECTRIC INFORMATION DEVICE

This Nonprovisional Application claims priority under 35 U.S.C. §119(a) on Patent Application No. 2007-147509 filed in Japan on Jun. 1, 2007, the entire contents of which are hereby incorporated by reference.

BACKGROUND OF THE INVENTION

1. Field of the Invention

The present invention is related to a solid-state image capturing apparatus and an electronic information device, and more specifically to an improved version of an amplified solid-state image capturing apparatus whose pixel section includes an amplifying circuit and an electronic information device using the amplified solid-state image capturing apparatus therein.

2. Description of the Related Art

In general, an amplified solid-state image capturing apparatus includes a pixel array section, the pixel array section being two-dimensionally arranged with pixel sections (also simply referred to as pixels hereinafter), which have an amplifying function; and a scanning circuit positioned near the pixel array section.

As an example of such an amplified solid-state image capturing apparatus, an APS (Active Pixel Sensor) image sensor, which is configured with a CMOS circuit that is advantageous for pixels to integrate with a peripheral driving circuit and signal processing circuit, is known. Further, of all the APS image sensors, a four-transistor APS image sensor is becoming popular in recent years.

Figure 4:
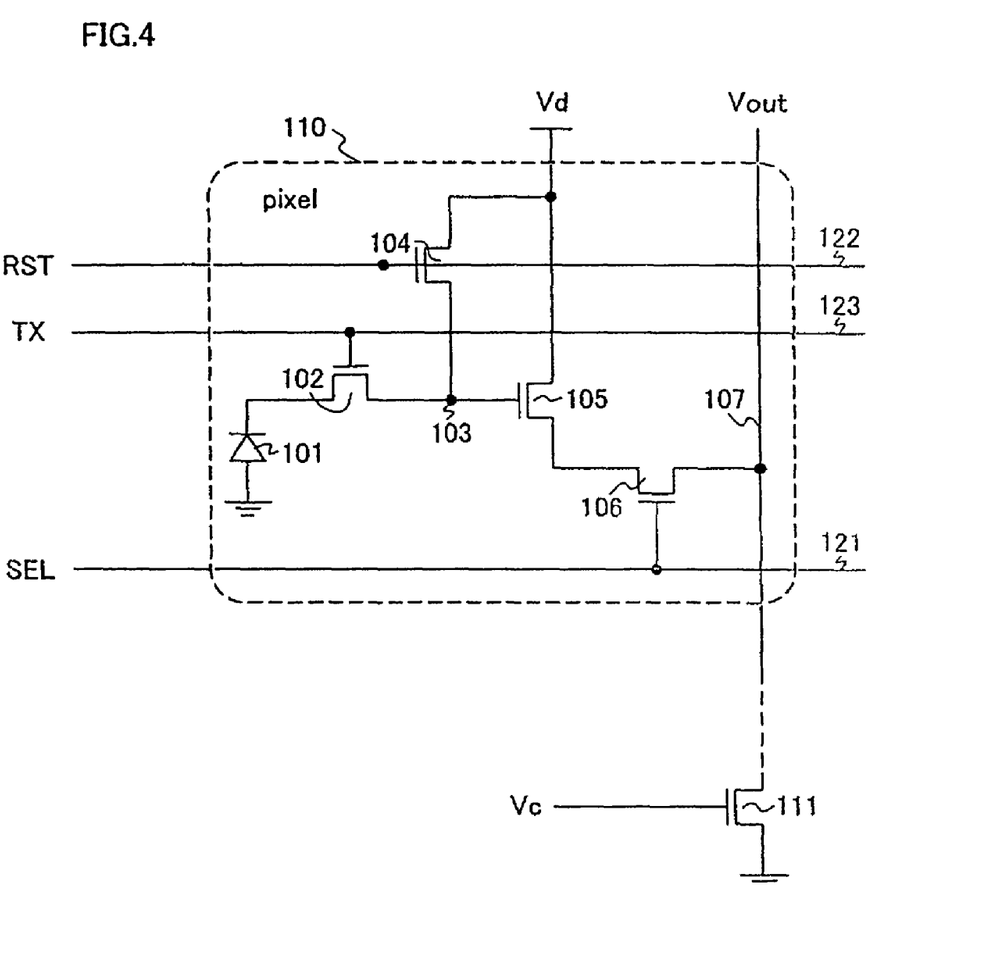
FIG. 4 is a diagram explaining a conventional four-transistor amplified solid-state image capturing apparatus, showing a circuit structure of a pixel section that configures the amplified solid-state image capturing apparatus.

FIG. 4 is a diagram explaining a conventional four-transistor amplified solid-state image capturing apparatus, showing a circuit structure of an individual pixel (unit pixel) that constitutes the solid-state image capturing apparatus.

As shown in FIG. 4, a pixel 110, which constitutes the conventional solid-state image capturing apparatus, is configured with a light receiving section 101 for converting light to electrons; a transfer transistor 102 for transferring a signal charge generated in the light receiving section 101 to a signal charge accumulation section 103; an amplifying transistor 105 for amplifying the signal charge transferred to the signal charge accumulation section 103 to generate a corresponding signal voltage; a reset transistor 104 for resetting the signal charge accumulation section 103, or a gate of the amplifying transistor 105, to a power supply voltage Vd; and a selection transistor 106 for transferring an output of the amplifying transistor 105 to a readout signal wire 107. In the solid-state image capturing apparatus described above, a plurality of pixels of such a structure are arranged in two dimensions, or in a matrix. The readout signal wire 107 described above is provided for each pixel row and every selection transistor for pixels in each pixel row is connected to the corresponding readout signal line 107. In addition, each readout signal line 107 is connected to a corresponding one constant current source load 111. The constant current source load 111 is configured with a transistor which is connected between one end of the readout signal line 107 and a ground connection, and the gate of the transistor is set to a constant voltage Vc.

Herein, the light receiving section 101 is generally configured with a buried photodiode (photoelectric conversion element). In addition, the transfer transistor 102 described above is connected between the signal charge accumulation section 103, which accumulates signal charges from the light receiving section 101, and a cathode of the photodiode, and its gate is connected to a transfer gate selection wire 123. The signal charge accumulation section 103 is also referred to as a floating diffusion section (FD section) hereinafter. The transfer transistor 102 is turned on when the voltage level of the transfer gate selection wire 123 is at a high level and transfers a signal charge generated in a photodiode to the signal charge accumulation section 103.

Further, the reset transistor 104 is connected between the signal charge accumulation section 103 and a source of voltage (power supply voltage Vd), and its gate is connected to a reset signal line 122. When the voltage level of the reset signal line 122 is at a high level, the reset transistor 104 is turned on and resets an electric potential of the signal charge accumulation section 103 described above to the power supply voltage Vd. Further, the amplifying transistor 105 and the selection transistor 106 described above are connected in series between the source of voltage (power supply voltage Vd) and the readout signal line 107 described above. A gate of the amplifying transistor 105 on the side of the source of voltage is connected to the signal charge accumulation section 103 described above. In addition, a gate of the selection transistor 106 on the side of the readout signal line is connected to a selection signal line 121, and when the voltage level of the selection signal line is at a high level, the selection transistor 106 is turned on and selects the pixel so that a signal voltage of the corresponding pixel is read out by the readout signal line 107.

Next, an operation will be described.

In the light receiving section 101, a signal charge is generated by photoelectric conversion of an incident light, and the signal charge generated in the light receiving section 101 is transferred to the signal charge accumulation section (FD section) 103 by the transfer transistor 102. The signal charge accumulation section 103 is reset to the power supply voltage Vd by the reset transistor 104 before the signal charge is transferred from the light receiving section 101. Therefore, each electric potential of the signal charge accumulation section 103 is amplified by the amplifying transistor 105 after resetting and after transferring the signal charge, and the electric potential is read out by the readout signal line 107 through the selection transistor 106. At the same time, a current corresponding to the electric potential of the signal charge accumulation section 103 is supplied from the pixel 110 to the readout signal line 107, and the supplied current is discharged to the ground connection side through the constant current source load 111. Accordingly, a readout voltage, which corresponds to the current supplied by the pixel 110, is generated in the readout signal line 107 and the readout voltage is output to a circuit in a latter part, so that a pixel data of each pixel is obtained.

In such a CMOS image sensor, problems, such as the decrease of the amount of signal charges due to the scaling down of a photoelectric conversion device (i.e., photodiode) and the increase of noise due to miniaturization of an amplifying MOS transistor, arise as miniaturization of pixel pitch makes a progress from 2.2 μm to 1.75 μm. Therefore, it is more effective to decrease the number of transistors themselves to decrease the area occupied by the transistors and increase the size of the photoelectric conversion devices than the miniaturization of the size of transistors. As a method to accomplish this, a three-transistor pixel structure (3TR structure) is proposed where a unit pixel is configured with a photoelectric conversion device and three transistors.

Figure 5:
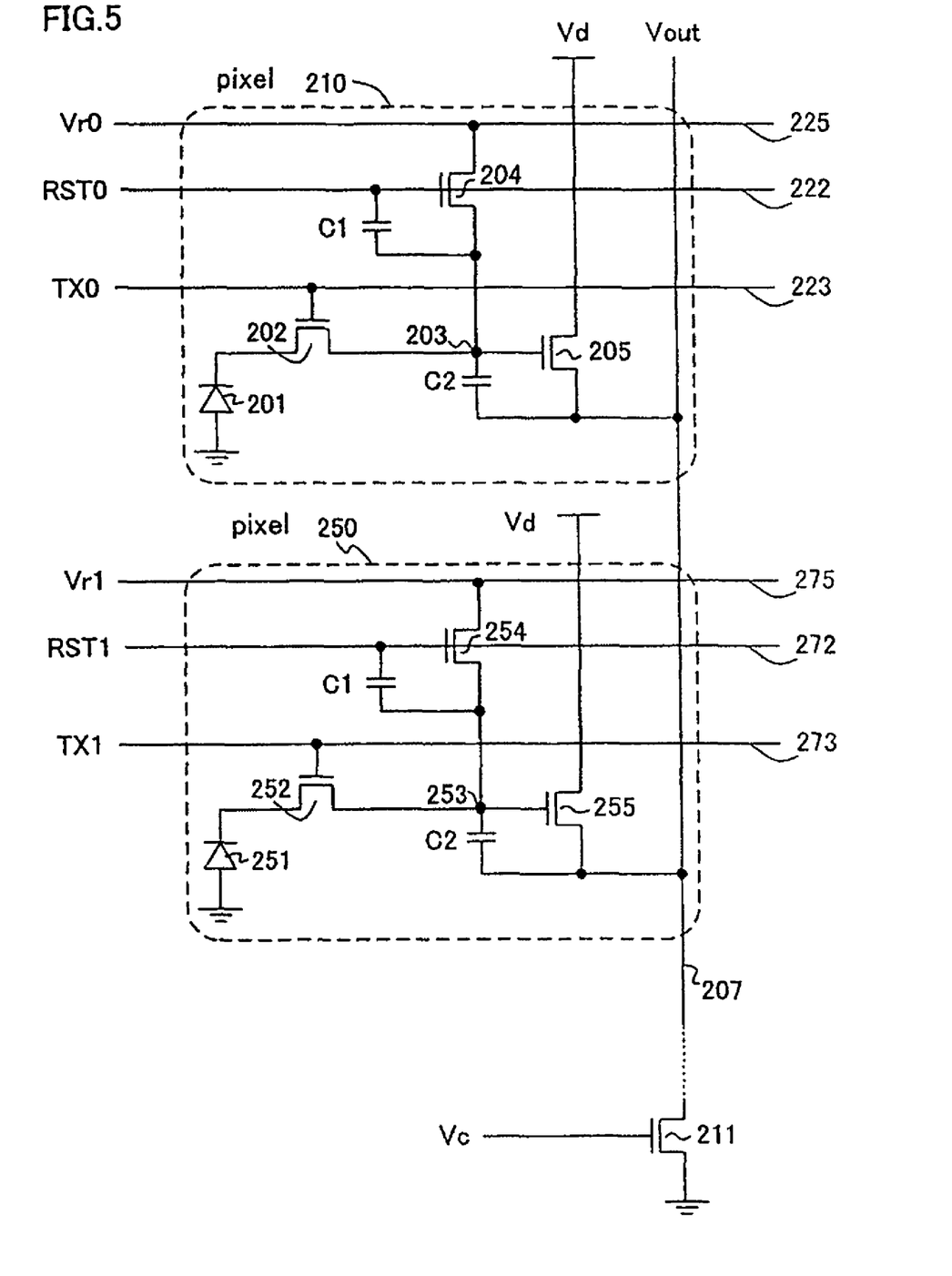
FIG. 5 is a diagram explaining a conventional three-transistor amplified solid-state image capturing apparatus, showing a circuit structure of a pixel section that configures the amplified solid-state image capturing apparatus.

FIG. 5 is a diagram explaining a unit pixel (also simply referred to as a pixel hereinafter) with a 3TR structure), showing a circuit structure of two unit pixels connected to one readout signal line.

For example, a pixel 210 with 3TR structure includes a light receiving section 201 configured with a photodiode (electric conversion element); a transfer transistor 202 connected between the light receiving section 201 and a signal charge accumulation section 203 for accumulating signal charges from the light receiving section 201; a reset transistor 204 connected between the signal charge accumulation section 203 and a reset drain wiring 225; and an amplifying transistor 205 connected between a source of voltage (power supply voltage Vd) and a readout signal line 207.

Herein, a transfer gate selection line 223 is connected to a gate of the transfer transistor 202 described above, and the transfer transistor 202 receives a transfer pulse signal TXO from the transfer gate selection line 223 to transfer a signal charge generated in the light receiving section 201 to the signal charge accumulation section 203. In addition, a reset signal line 222 is connected to a gate of the reset transistor 204, and the reset transistor 204 applies a voltage Vr0 of the reset drain wiring 225 to the signal charge accumulation section 203 in response to a reset signal RST0 from the reset signal line 222.

Similar to the pixel 210 with a 3TR structure described above, a pixel 250 with a 3TR structure is configured with a photodiode (electric conversion element), and the pixel 250 includes a light receiving section 251 for generating a signal charge by photoelectric conversion; a transfer transistor 252 for transferring the signal charge to a signal charge accumulation section 253 based on a transfer pulse signal TX1 from a transfer gate selecting line 273; a reset transistor 254 for applying a voltage Vr1 of a reset drain wiring 275 to the signal charge accumulation section 253 based on a reset signal RST1 from a reset signal line 272; and an amplifying transistor 255 for amplifying a signal voltage generated in the signal charge accumulation section 253 or a reset voltage and outputting the signal voltage or the reset voltage to the readout signal line 207.

The pixels 210 and 250, together with other pixels in the same row, are connected to the readout signal line 207, and the readout signal line 207 is connected to a constant current source load 211. The constant current source load 211 is constituted by a transistor that is connected between one end of the readout signal line 207 and a ground connection, and a gate of the transistor is set to a constant voltage Vc.

As shown in FIG. 5, the unit pixels 210 and 250 of such a 3TR structure, which differs from a unit pixel of a 4TR structure, is not provided with a transistor that corresponds to a selection transistor connected in series to the amplifying transistor 105 in FIG. 4. Therefore, a pixel selection operation for selecting a predetermined pixel from a plurality of pixels connected to the readout signal line 207 is not performed by a selection transistor in a 4TR structure but performed by controlling electric potentials of the FD sections 203 and 253, which are signal charge accumulation sections.

Next, an operation will be described.

Figure 6:
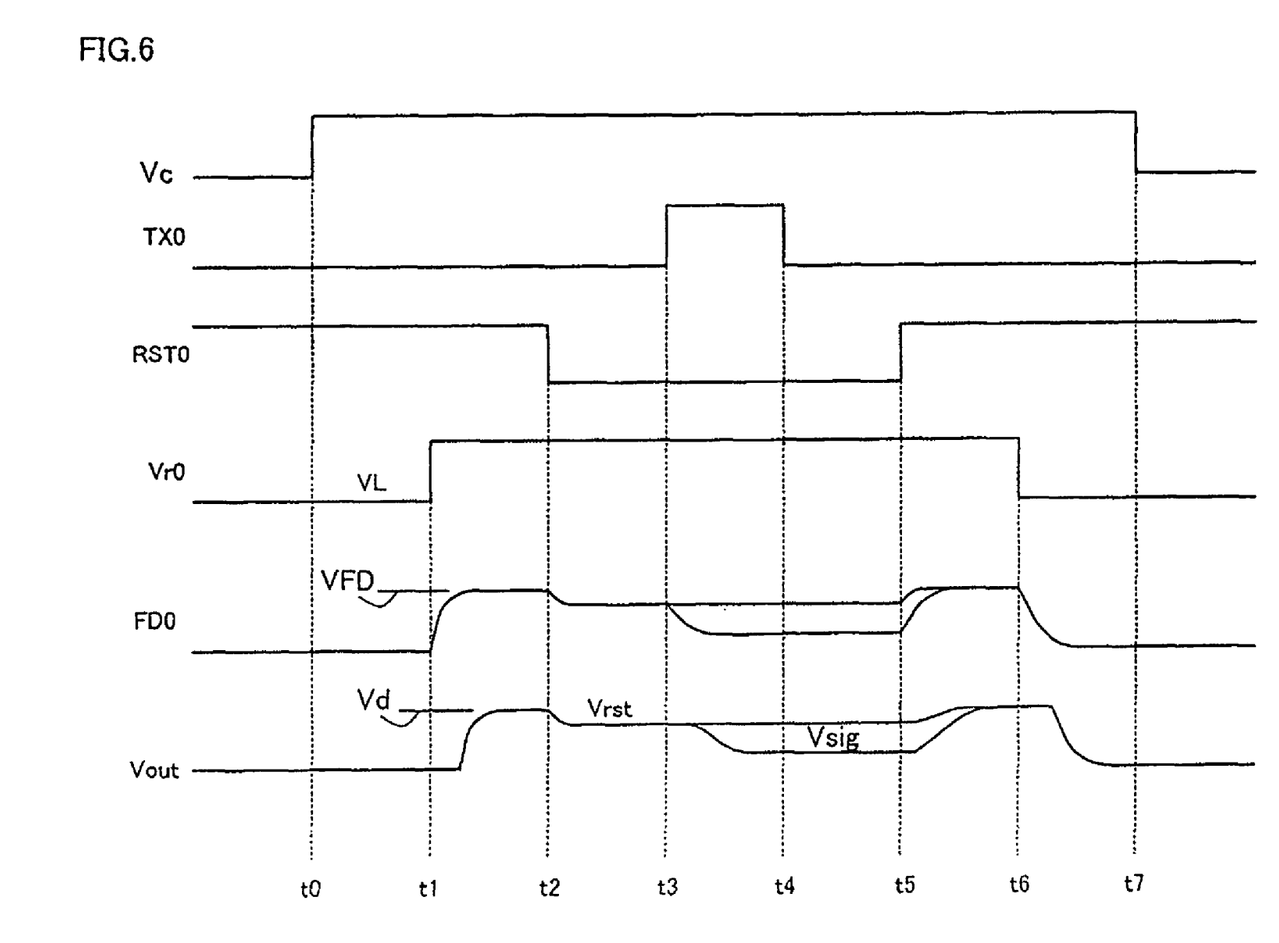
FIG. 6 is a diagram showing a driving of a conventional three-transistor amplified solid-state image capturing apparatus, showing a timing chart of a readout operation of a pixel data.

FIG. 6 shows an example of a timing chart of a driving pulse that drives a unit pixel of a 3TR structure.

By controlling the transfer gate selection lines 223 and 273, the reset signal lines 222 and 272, and the reset drain wirings 225 and 275, the voltage of the FD sections 203 and 253 in each pixel are changed, and the voltage of the readout signal line 207 is also changed accordingly.

In the case where the pixel 210 is selected, for example, signal levels RST0 and RST1 of the reset gate wirings 222 and 272 rise after signal levels Vr0 and Vr1 of the reset drain lines 225 and 275 are set to low level electric potentials (VL), so that the electric potentials of the FD sections 203 and 253 are set to a low level (low reset).

Next, the constant current source load 211 of the readout signal line 207 that corresponds to a pixel row with the pixel 210 is operated by raising a gate control voltage Vc of a transistor that configures the constant current source load 211 (time t0). Subsequently, by changing the electric potential Vr0 of the reset drain wiring 222 connected to the selected pixel 210 to a high level (time t1), only an electric potential FD0 of the FD section 203 of the selected pixel 210 is changed to a high level (high reset). At this time, the voltage (VFD) of the FD section 203 is:

$$VFD = Vd - Vth \qquad \text{(equation 1)}$$

Herein, Vd is power supply voltage, and Vth is threshold voltage of the reset transistor 204. In this manner, the voltage VFD of the FD section 203 becomes smaller than the power supply voltage Vd, and therefore it is disadvantageous to complete charge transferring. As a solution, a transistor with low threshold voltage or a depletion-type transistor as the reset transistor 204 is used, so that the voltage of the FD section 203 at the time of high reset can be raised near the power supply voltage.

Next, if the signal level RST0 of the reset gate wiring 222 of the selected pixel 210 falls (time t2), the electric potential FD0 of the FD section 203 falls because of a coupled capacitance C1 between the gate of the reset transistor 204 and the FD section 203. Further, the change in the electric potential FD0 appears in the readout signal line 207 through the amplifying transistor 205, and therefore the voltage Vout of the readout signal line 207 also falls, and further, the voltage VD0 of the FD section 203 falls because of a coupled capacitance C2 between the readout signal line 207 and the gate of the amplifying transistor 205.

Due to the effect of the combining of these capacitances, the electric potential FD0 of the FD section 203 becomes smaller than the power supply voltage Vd. The signal line voltage (reset level) Vout corresponding to the voltage FD0 of the FD section 203 is taken in to a circuit in the next step (not shown) that is connected to the readout signal line 207.

Subsequently, when a transfer gate pulse (transfer pulse signal) TX0 is applied to the transfer transistor 202 (time t3 to t4), a signal charge is transferred from the light receiving section 201 to the FD section 203, so that the electric potential FD0 of the FD section 203 falls and the voltage level Vout of the readout signal line 207 simultaneously decreases. The voltage Vout of the readout signal line 207 is taken as a signal level Vsig into the circuit in the next step. The circuit in the next step takes the difference between the reset level Vrst and the signal level Vsig to output it as a pixel signal of the selected pixel 210.

After the signal level RST0 of the reset drain wiring 222 turns to be at a high level (time t5) and the electric potential FD0 of the FD section 203 turns to be at a high level, the signal level of the reset drain wiring 225 turns to be at a low level (time t6) and the electric potential of the FD section 203 turns to be at a low level. Then, the transistor 211 that configures the constant current source load turns to be off (time t7).

During such readout of a pixel signal from a selected pixel, the voltage level Vr1 of the reset drain wiring 275 of an unselected pixel 250 is at a low level and the signal level RST1 of the reset signal line 272 is at a high level. Therefore, the electric potential of the FD section 253 of the unselected pixel 250 is fixed to a low level, and the electric potential of the FD section 253 will not change even if the electric potential of the readout signal line 207 changes.

However, such a drive causes the voltage of the FD section 207 after resetting to decrease because of the coupled capacitance C1 between the gate of the reset transistor 204 and the FD section 203 as well as the coupled capacitance C2 between the readout signal line 207 and the gate of the amplifying transistor 205. Therefore, a problem arises that a complete transferring (no afterimage) cannot be performed because a sufficient electric potential is not secured between the photoelectric conversion element (light receiving section) 201 and the FD section 203 when the transfer transistor 202 is turned on.

Reference 1 discloses a method for raising the voltage of an electric potential of an FD section in a 3TR structure pixel as a solution for such a problem.

In the method described above, it is necessary to set the width of the reset pulse that resets the electric potential of the FD section shorter than the time for the readout signal line 207 to follow the reset voltage of the FD section 203.

That is, if the voltage Vr0 of the reset drain wiring 225 rises and the FD section 203 reaches a reset level and subsequently the signal level RST0 of the reset signal line 222 falls before the readout signal line 207 follows, the electric potential of the FD section 203 decreases because of the coupled capacitance C1 of the gate of the reset transistor. At this time, however, the readout signal line 207 is still on the way to rise, and therefore the voltage of the FD section 203 rises because of the coupled capacitance C2 between the FD section 203 and the readout signal line 207. Consequently, the reset level of the FD section can be set high without decreasing the electric potential of the FD section by the coupled capacitance.

Figure 7:
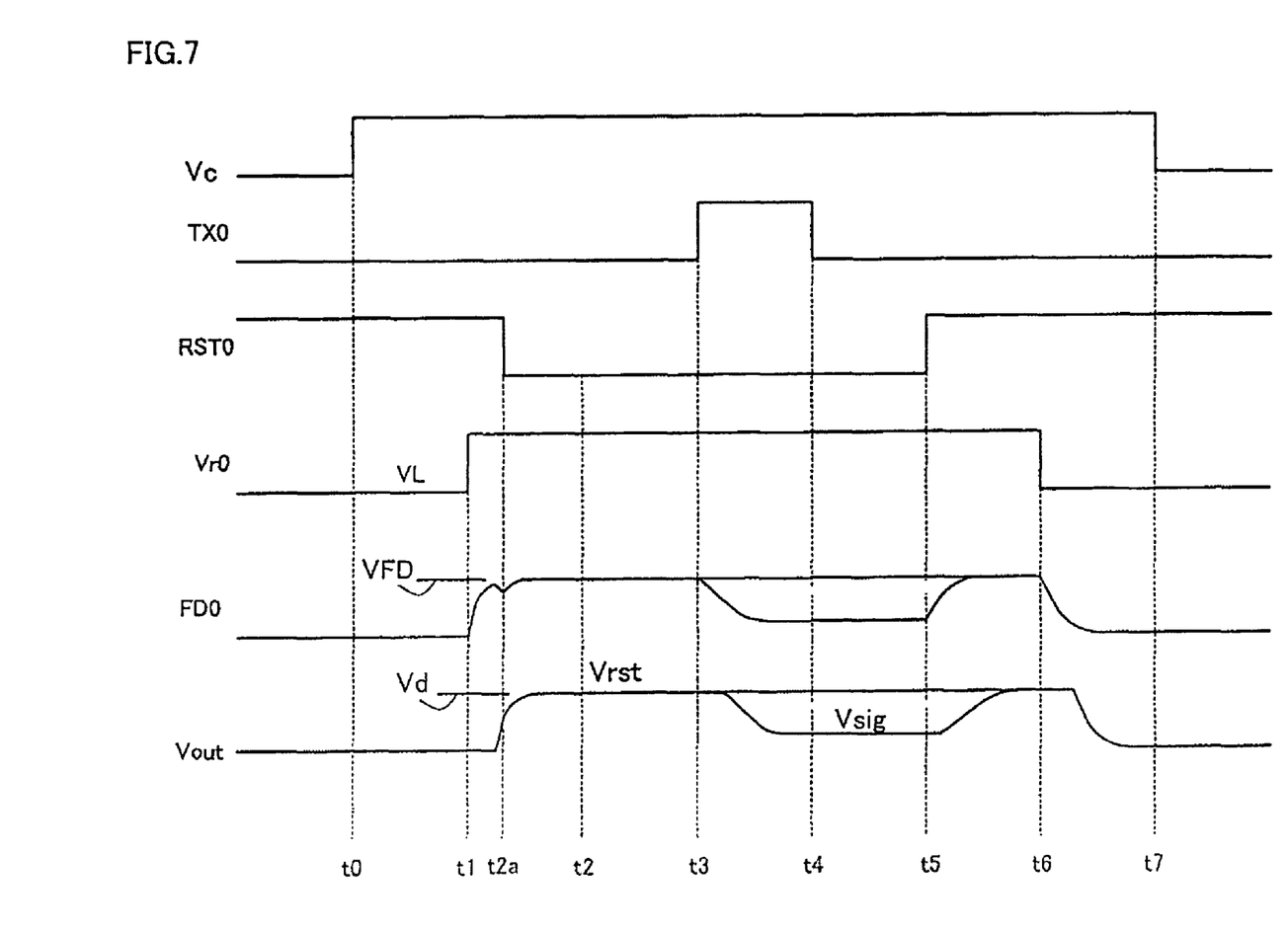
FIG. 7 is a diagram showing a case where the method disclosed in Reference 1 is applied for the operation of the three-transistor pixel 210 shown in FIG. 5.

The method disclosed in Reference 1 will be briefly explained using FIG. 7 where the method is applied for the operation of the pixel 210 shown in FIG. 5.

In the selected pixel 210 shown in FIG. 5, in a state where the signal level RST0 of the reset signal line 222 is at a high level and the reset transistor 204 is turned on, when the electric potential level Vr0 of the reset drain wiring 225 is at a high level (time t1) the amplifying transistor 205 is turned on and the charging by the power supply voltage Vd of the readout signal line 207 is performed. Next, if the signal level RST0 of the reset signal line 222 falls (time t2a) before the readout signal line 207 follows the power supply voltage Vd due to the charging, the decrease of the electric potential FD0 of the FD section 203 because of the coupled capacitance C1 between the gate of the reset transistor 204 and the FD section 203 is counteracted by the rise of the readout signal line 207 that is capacitively-coupled with the FD section 203. As a result, the electric potential level FD0 of the FD section 203 is maintained at or above the power supply voltage Vd.

Reference 1: Japanese Laid-Open Publication No. 2005-86595

SUMMARY OF THE INVENTION

However, according to the method described above, response times necessary for the readout signal line to follow the power supply voltage vary for the reset pulse width and response times of the readout signal line vary depending on the location of the pixel, so that reset electric potentials of the FD sections vary. As a result, a complete transferring of a signal charge generated in the light receiving section cannot be performed.

The present invention is intended to solve the problem described above. The objective of the present invention is to provide a solid-state image capturing apparatus, which, in a pixel of a 3TR structure, increases the reset electric potential of the signal charge accumulation section (FD section) upon a reset operation so that an electric potential difference between the signal voltage and the reset voltage upon transferring of a signal charge is sufficiently secured, a complete transferring of the signal charge is easily performed from the photoelectric conversion element (light receiving section) to the signal charge accumulation section, and a stable condition is provided; and an electric information device using the solid-state image capturing apparatus.

A solid-state image capturing apparatus according to the present invention includes: a plurality of pixels arranged in two dimensions; and a readout signal line for reading out a signal charge from each pixel in each pixel row, the readout signal line being provided for each pixel line, in which each pixel has a circuit structure including a photoelectric conversion element for performing a photoelectric conversion on an incident light, a signal charge accumulation section for accumulating the signal charge obtained by the photoelectric conversion, a transfer transistor for transferring the signal charge from the photoelectric conversion element to the signal charge accumulation section, a reset transistor for resetting an electric potential of the signal charge accumulation section to a reference voltage, and an amplifying transistor for amplifying the electric potential of the signal charge accumulation section to readout the electric potential in the readout signal line, in which a source side is connected to the readout signal line and a gate is connected to the signal charge accumulation section, in which the solid-state image capturing apparatus further includes: an electric potential setting section for setting an electric potential of the readout signal line of a corresponding pixel row, the electric potential setting section being provided for each pixel row; and a control section for, in a state where the electric potential setting section is controlled to maintain the electric potential of the readout signal line at a first electric potential, turning on the reset transistor to reset the electric potential of the signal charge accumulation section to a reference voltage and subsequently turning off the reset transistor and simultaneously controlling the electric potential setting section to change the electric potential of the readout signal line to a second electric potential so as to change the electric potential of the signal charge accumulation section in a reverse direction from the electric potential change of the signal charge accumulation section due to the turning off of the reset transistor, thereby achieving the objective described above.

In a solid-state image capturing apparatus according to the present invention, the first electric potential is an electric potential between a power supply voltage and a ground connection voltage, and the second electric potential is greater than the first electric potential.

In a solid-state image capturing apparatus according to the present invention, the electric potential setting section includes: a column selection section for supplying the second electric potential to the readout signal line through the amplifying transistor, the column selection section being connected between a wiring that commonly connects drains of amplifying transistors in pixels of each of the pixel row and a source of voltage; and a signal line electric potential maintenance section, which is provided for each pixel row, for maintaining the electric potential of the readout signal line of the corresponding pixel row at the first electric potential.

In a solid-state image capturing apparatus according to the present invention, the column selection section is configured with a column selection transistor connected between the source of voltage and the wiring that commonly connects the drains of the amplifying transistors, and a gate of the column selection transistor is connected to a column selection line, in which an electric potential is controlled by the control section.

In a solid-state image capturing apparatus according to the present invention, the signal line electric potential maintenance section is configured with a first conductive transistor and a second conductive transistor connected in series between the source of voltage and the ground connection, and a gate of the first conductive transistor on the side of the source of voltage is connected to a selection signal line for controlling an on-off operation of the transistor, and a constant bias voltage is applied for a gate of the second conductive transistor on the side of the ground connection.

In a solid-state image capturing apparatus according to the present invention, a selection of a pixel in the pixel row is performed by controlling an electric potential of the signal charge accumulation section of a pixel to be selected in the pixel row.

In a solid-state image capturing apparatus according to the present invention, the control section performs a selection of a pixel in the pixel row by turning on a reset transistor of a pixel to be selected in the pixel row as well as changing the electric potential of a reset drain wiring connected to a reset transistor of a pixel to be selected into a power supply electric potential.

In a solid-state image capturing apparatus according to the present invention, the control section turns on the transfer transistor after performing a selection of a pixel in the pixel row so as to transfer the signal charge generated in the photoelectric conversion element to the signal charge accumulation section of the selected pixel.

In a solid-state image capturing apparatus according to the present invention, the photoelectric conversion element is a buried photodiode.

In a solid-state image capturing apparatus according to the present invention, the electric potential setting section includes: a column selection section, which is connected between a wiring that commonly connects drains of amplifying transistors in pixels of each of the pixel row and a source of voltage, for supplying the second electric potential to the readout signal line through the amplifying transistor; and a signal line electric potential maintenance section, which is provided for each pixel row, for maintaining the electric potential of the corresponding readout signal line at the first electric potential, in which, before transferring the signal charge from the photoelectric conversion element to the signal charge accumulation section, in a state where the signal line electric potential maintenance section is turned on and the electric potential of the readout signal line is maintained at the first electric potential, the control section turns on a reset transistor of a selected pixel in the pixel row for a predetermined period of time and resets the signal charge accumulation section of the selected pixel in such a manner that the electric potential of the signal charge accumulation section becomes greater than the electric potential of each signal charge accumulation section in each unselected pixel.

In a solid-state image capturing apparatus according to the present invention, after resetting the electric potential of the signal charge accumulation section in the selected pixel, the control section controls the column selection section and the signal line electric potential maintenance section to raise the electric potential of the signal charge accumulation section greater than the electric potential immediately after the resetting, in such a manner that the electric potential of the readout signal line becomes the second electric potential, which is greater than the first electric potential.

In a solid-state image capturing apparatus according to the present invention, the column selection section is configured with a column selection transistor whose conductivity is different from the amplifying transistor.

A solid-state image capturing apparatus according to the present invention includes an inverter that reverses a column selection signal provided from the control section, and applying an output of the inverter for a gate of the column selection transistor.

In a solid-state image capturing apparatus according to the present invention, a transistor that configures the column selection section is an n-type conductive column selection transistor, and a transistor-on voltage, which is greater than the power supply voltage, is applied for a gate of the n-type conductive column selection transistor.

A solid-state image capturing apparatus according to the present invention includes a level shifter for level-shifting a high-level electric potential of a column selection signal provided from the control section to a voltage higher than the power supply voltage, and applying an output of the level shifter for a gate of the column selection transistor.

In a solid-state image capturing apparatus according to the present invention, the electric potential of the readout signal line is changed from the first electric potential to the second electric potential at the resetting time of the signal charge accumulation section while an electric potential difference between the electric potential of the signal charge accumulation section and the electric potential of the readout signal line is maintained at a predetermined value.

In a solid-state image capturing apparatus according to the present invention, the control section controls the signal line electric potential maintenance section and the column selection section so that the signal line electric potential maintenance section and the column selection section are turned on together for a certain period of time at the resetting time of the signal charge accumulation section.

In a solid-state image capturing apparatus according to the present invention, the reset transistor is a depletion-type MOS transistor.

In a solid-state image capturing apparatus according to the present invention, the electric potential of the signal charge accumulation section of the unselected pixel is kept constant during a readout period of a signal charge from the selected pixel.

In a solid-state image capturing apparatus according to the present invention, the electric potential of the signal charge accumulation section of the unselected pixel is smaller than the sum of the first voltage and threshold voltage of the amplifying transistor.

An electric information device according to the present invention uses the solid-state image capturing apparatus according to the present invention as an image capturing section, thereby achieving the objective described above.

The functions of the present invention having the structures described above will be described hereinafter.

According to the present invention, a pixel is configured with a 3TR structure including a transfer transistor for transferring a signal charge from a photoelectric conversion element to a signal charge accumulation section, a reset transistor for resetting an electric potential of the signal charge accumulation section to a reference voltage, and an amplifying transistor for amplifying the electric potential of the signal charge accumulation section to readout the electric potential in the readout signal line, and an electric potential setting section for setting an electric potential of the readout signal line is provided. The electric potential of the signal charge accumulation section is reset to a reference voltage while the electric potential of the readout signal line is maintained at a first electric potential. Subsequently, the reset transistor is turned off and simultaneously the electric potential of the readout signal line is changed such that the electric potential of the signal charge accumulation section is changed in a reverse direction from the electric potential change of the signal charge accumulation section due to the turning off of the reset transistor. Therefore, the change in the reset voltage in the signal charge accumulation section due to the turning off of the reset transistor can be controlled by the voltage change of a readout signal and the capacitance coupling between the readout signal line and the signal charge accumulation section. Alternatively, the reset voltage can be set to a more appropriate electric potential. Thereby, a solid-state image capturing apparatus, which sufficiently secures an electric potential difference between the signal voltage and the reset voltage upon transferring of a signal charge, easily performs a complete transferring of the signal charge from the photoelectric conversion element to the signal charge accumulation section, and is stable, is obtained.

In addition, according to the present invention, the electric potential setting section has a structure having a column selection section for supplying a second electric potential to the readout signal line, and a signal line electric potential maintenance section for maintaining the electric potential of the readout signal line at the first electric potential, and as a result, the electric potential of the readout signal line can be changed from the first electric potential to the second electric potential by a simple operation of switching between the operation of the column selection section and the operation of the signal line electric potential maintenance section.

Further, according to the present invention, the signal line electric potential maintenance section is configured with a first conductive transistor and a second conductive transistor connected in series between a source of voltage and a ground connection. The first conductive transistor on the side of the source of voltage is on-off controlled by a selection signal line and a constant bias voltage is applied for a gate of the second conductive transistor on the side of the ground connection, so that the holding potential for the readout signal line is controllable by the bias voltage.

Further, according to the present invention, a transistor that configures a column selection section is an n-type conductive transistor, so that the transistor size can be decreased. In addition, transistor-on voltage, which is larger than the power supply voltage, is applied for the gate of the transistor, so that the power supply voltage, which is supplied to an amplifying transistor through the column selection section, is prevented from being decreased by threshold voltage of the amplifying transistor.

Further, according to the present invention, the electric potential of the readout signal changes from the first electric potential without fail because the operation of the signal electric potential maintenance section for setting the readout signal line to the first electric potential and the operation of the column selection section for setting the readout signal line to the second electric potential overlap with each other for a certain period of time when the electric potential of the readout signal line is changed from the first electric potential to the second electric potential.

Further, according to the present invention, the reset transistor is a depletion-type MOS transistor, so that the power supply voltage, which is supplied to the signal charge accumulation section through the reset transistor, is prevented from being decreased by threshold voltage of the reset transistor.

Further, according to the present invention, an unselected pixel is prevented from being selected during a read out of a selected pixel because the electric potential of the signal charge accumulation section of the unselected pixel is constantly maintained during a readout period of a signal charge from the selected pixel.

Further, according to the present invention, the amplifying transistor of the unselected pixel is completely turned off because the electric potential of the signal charge accumulation section of the unselected pixel is smaller than the sum of the first voltage and the threshold voltage of the amplifying transistor.

With the structures described above, according to the present invention, a solid-state image capturing apparatus, which, in a pixel of a 3TR structure, increases the reset electric potential of the signal charge accumulation section (FD section) upon a reset operation so that an electric potential difference between the signal voltage and the reset voltage upon transferring of a signal charge is sufficiently secured, a complete transferring of the signal charge is easily performed from the photoelectric conversion element (light receiving section) to the signal charge accumulation section, and a stable condition is provided, is obtained.

These and other advantages of the present invention will become apparent to those skilled in the art upon reading and understanding the following detailed description with reference to the accompanying figures.

BRIEF DESCRIPTION OF THE DRAWINGS

FIG. 1(a) schematically shows an overall structure of the solid-state image capturing apparatus; and FIG. 1(b) shows a circuit structure of a 3TR structure pixel in the solid-state image capturing apparatus.

10 solid-state image capturing apparatus
  10a pixel array section
  10b control section
  401, 451 photoelectric conversion section (light receiving section)
  402, 452 transfer transistor
  403, 453 signal charge accumulation section (FD)

404, 454 reset transistor
405, 455 amplifying transistor
407 readout signal line
410, 450 pixel section
411 constant current source load
415 p-type transistor
416 n-type transistor
422, 472 reset signal line
423, 473 transfer gate selection line
425, 475 reset drain wiring
420, 520 column selection section
430, 530 wiring section
440 signal line electric potential maintenance section

DESCRIPTION OF THE PREFERRED EMBODIMENTS

Hereinafter, embodiments of the present invention will be described.

Embodiment 1

Figure 1:
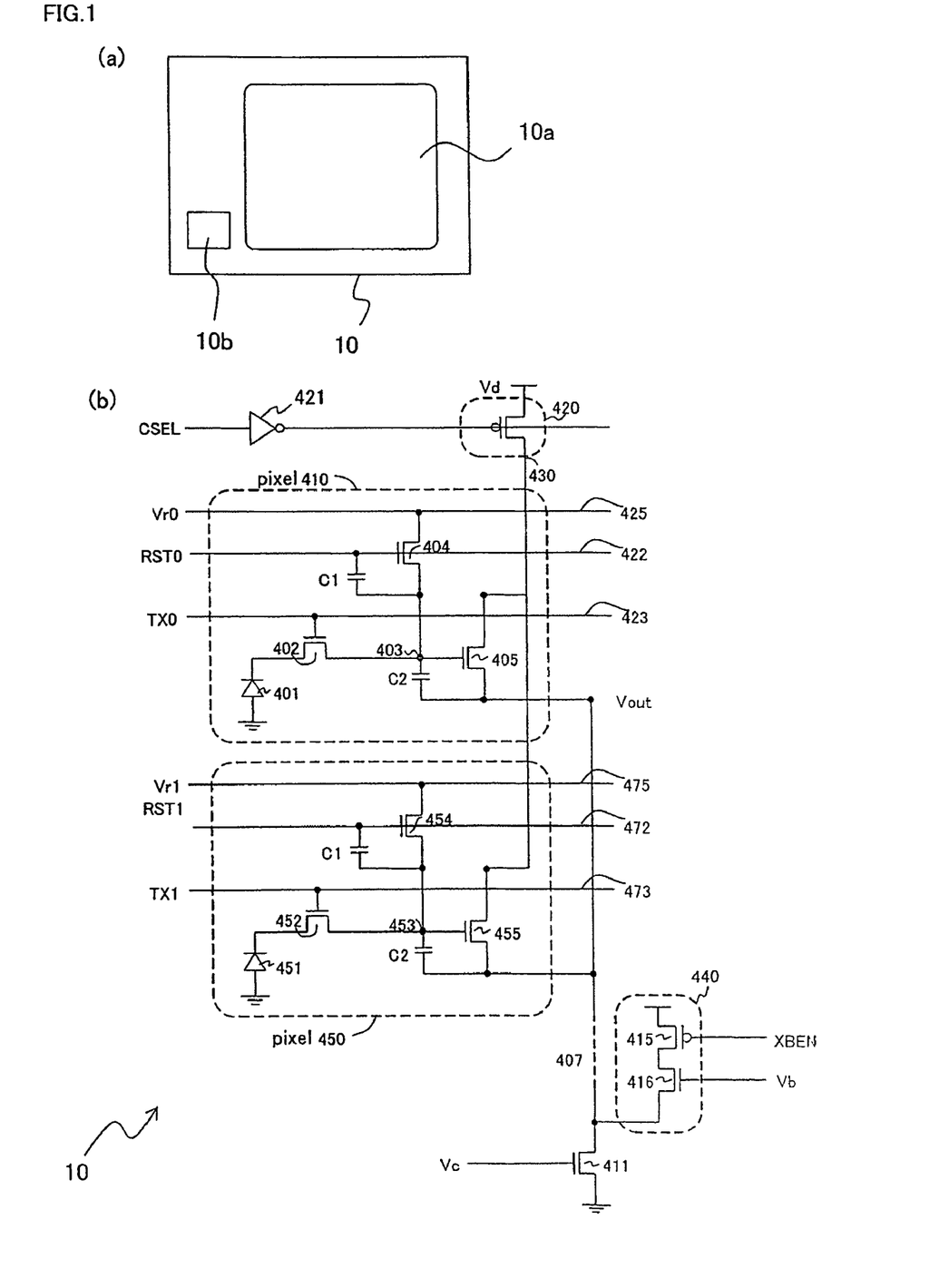
FIG. 1 is a diagram showing an amplified solid-state image capturing apparatus according to Embodiment 1 of the present invention.

FIG. 1 is a diagram showing an amplified solid-state image capturing apparatus according to Embodiment 1 of the present invention. FIG. 1(a) schematically shows an overall structure of the solid-state image capturing apparatus. FIG. 1(b) shows a circuit structure of a 3TR structure pixel in the solid-state image capturing apparatus.

An amplified solid-state image capturing apparatus 10 according to Embodiment 1 includes a pixel array 10a in which 3TR structure pixels are arranged in a two dimensional array; and a control section 10b, which is positioned near the pixel array 10a, for controlling the pixel array 10a.

Similar to a conventional pixel, a pixel 410 of a 3TR structure in the amplified solid-state image capturing apparatus 10 described above, is configured with a light receiving section 401 for converting light into electrons; a transfer transistor 402, in which a transfer gate selection line 423 is connected to a gate, for transferring a signal charge generated in the light receiving section 401 to a signal charge accumulation section 403; an amplifying transistor 405 for amplifying the level of the signal charge transferred to the signal charge accumulation section 403 to generate a corresponding signal voltage; and a reset transistor 404, in which a reset signal line 422 is connected to a gate, for resetting the signal charge accumulation section 403 to power supply voltage Vd.

Herein, the light receiving section 401 is generally configured with a buried photodiode (electric conversion element). In addition, the transfer transistor 402 described above is connected between a cathode of the photodiode and the signal charge accumulation section 403. A reset drain wiring 425 is connected to a drain of the reset transistor 404 described above, and a source of the reset transistor 404 described above is connected to the signal charge accumulation section 403 described above. A gate of the amplifying transistor 405 is connected to the signal charge accumulation section 403. Note that the signal charge accumulation section 403 described above is also referred to a floating diffusion section (FD section) hereinafter.

In addition, similar to the pixel 410 of a 3TR structure described above, a pixel 450 of a 3TR structure includes a photodiode (electric conversion element) 451 for generating a signal charge by a photoelectric conversion, a transfer transistor 452 for transferring the signal charge to a signal charge accumulation section 453, a reset transistor 454 for applying reset voltage to the signal charge accumulation section 453, and an amplifying transistor 455 for amplifying the signal voltage generated in the signal charge accumulation section or the reset voltage to output it to a readout signal line 407. Herein, a transfer gate wiring 473 is connected to a gate of the transfer transistor 452, a reset signal line 472 is connected to a gate of the reset transistor 454, and a reset drain wiring 475 is connected to a drain of the reset transistor 454.

The pixels 410 and 450, together with other pixels in the same row, are connected to the readout signal line 407, and the readout signal line 407 is connected to a constant current source load 411. The constant current source load 411 is configured with a transistor connected between one end of the readout signal line 407 and the ground connection, and a gate of the transistor is set to a constant voltage Vc. In addition, it is desirable that the reset transistors 404 and 454 described above is a depletion-type transistor.

According to Embodiment 1, a signal line electric potential maintenance section 440 for maintaining the electric potential of the readout signal line 407 to a predetermined value (first electric potential) and the constant current source load 411 for drawing current from the readout signal line 407 are connected to an end section of the readout signal line 407.

The signal line electric potential maintenance section 440 is capable of being turned on and off by a selection signal line XBEN and capable of fixing the readout signal line 407 at any electric potential.

More specifically, the signal line electric potential maintenance section 440 is configured with a p-type transistor 415 and an n-type transistor 416 connected in series between the power supply voltage Vd and the readout signal line 407, and a gate of the p-type transistor 415 on the power supply side is connected to the selection signal line XBEN described above, and further bias voltage Vb is applied for a gate electrode of the n-type transistor 416. During the operation of the signal line electric potential maintenance section 440, the electric potential of the readout signal line 407 is maintained at the value of Vb-Vth. Herein, the Vth is threshold voltage of the n-type transistor 416.

Further, drains of the amplifying transistors 405 and 455 are connected to the column selection section 420 through a wiring layer 430. The column selection section 420 receives a signal from a column selection signal through an inverter 421 and supplies power supply voltage to a drain of an amplifying transistor of each pixel in a pixel row.

The column selection section 420 uses a p-type transistor in FIG. 1, so that voltage drop does not occur between the power supply voltage Vd and the wiring layer 430. The amplified solid-state image capturing apparatus of 3TR structure according to the present invention has a structure in which pixels in the column direction share a selection transistor unlike pixels of 4TR structure.

In addition, the control section 10b controls the signal levels of the reset drain wirings 425 and 475, the reset gate wirings 422 and 472, the transfer gate wiring 423 and 473, column selection signal CSEL, as well as the selection signal line XBEN so that the operation for reading out a pixel signal from a selected pixel to the readout signal line 407 and the operation for increasing the electric potential of the readout signal line at the time of reset are performed.

Next, an operation will be described.

Figure 2:
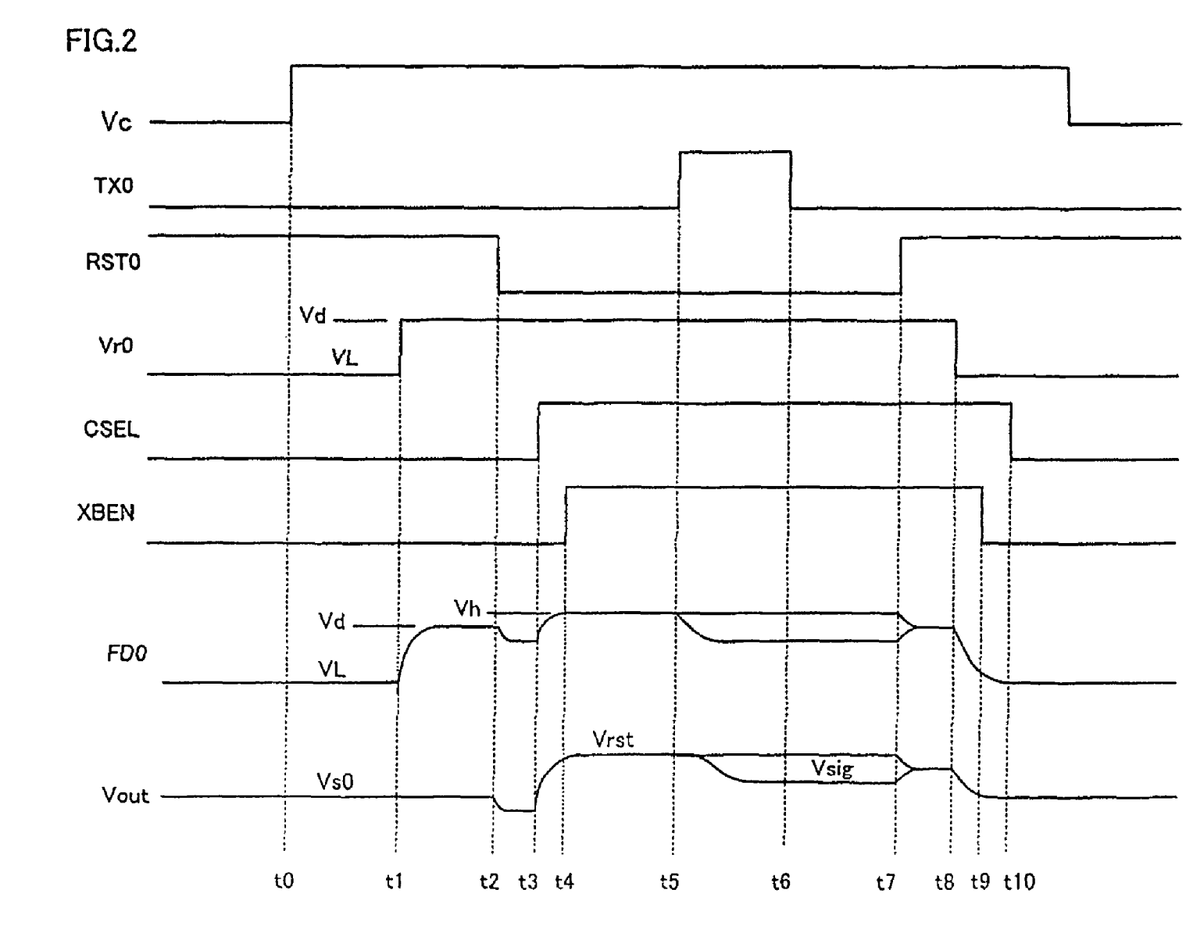
FIG. 2 is a timing chart showing a driving of a three-transistor amplified solid-state image capturing apparatus according to Embodiment 1.

FIG. 2 is a timing chart showing an operation of the amplified solid-state image capturing apparatus according to Embodiment 1.

First, in all the pixels when the constant current source load 411 operates at time t0, the reset signal line is at a high level, the reset drain wiring is at a low level (VL), the electric potential of the FD section is at a low level (VL), and the selection for a selected pixel is not made (low reset state).

At this time, the signal line electric potential maintenance section 440 is in an on state, and the readout signal line 407 is fixed to the electric potential (first electric potential) Vs0. In addition, it is desirable that the electric potential Vs0 be greater than the value VL−Vth.

In the case where Vs0 is smaller than the value VL−Vth, when the FD section is fixed to the low level VL, the current flowing into the amplifying transistor is a current in proportion to Log (VL−Vs0) in an operational state of a sub-threshold area of the amplifying transistor. As a result, in the case where the amount of the current is large, the electric potential of the FD section varies after the raising of the voltage if signal electric potentials (Vsig), which are read out from respective pixels, differ from each other depending on the distance between each pixel and the constant current source load 411. Therefore, it is desirable that the amount of the current flowing into the amplifying transistor be small, meaning that it is desirable that the Vs0 be large. However, the amount of the voltage to be raised becomes smaller if the Vs0 is large.

Then, by changing the level of the reset drain wiring Vr0 connected to the selected pixel from the low level to the high level (power supply voltage Vd) at the time t1, the electric potential FD0 of the FD section changes from the VL level (low level) to the Vd level (high level). At this time, the electric potential of the reset drain wiring connected to unselected pixel remains at the VL level.

By lowering the level of the reset wiring RST0 connected to the selected pixel from the high level to the low level at the time t2, the electric potential FD0 of the FD section becomes lower than the Vd level due to the coupled capacitance C1. In accordance with the decrease in the electric potential of the FD section, the electric potential Vout of the readout signal line 407 also decreases due to the coupled capacitance C2.

By changing the level of the column selection signal CSEL from the low level to the high level at time t3 and turning the signal line electric potential maintenance section 410 off at time 4, voltage is applied to the drain section of the amplifying transistor 405, so that the electric potential Vout of the readout signal line increases. Due to the increase of the electric potential of the readout signal line and the coupled capacitance C2, the electric potential FD0 of the FD section 403 increases to the Vh level, and the reset level Vrst of the readout signal line 407, which has been raised by the increase of the electric potential FD0 of the FD section, is taken into the circuit in the next step.

Herein, the rise of the column selection signal CSEL (time t3) and the turning off of the signal line electric potential maintenance section 440 (time t4) may occur at the same time. However, if the time t4 comes before the time t3 due to the variation of the rise times, the electric potential of the readout signal line 407 is drawn by the constant current source load 411, making it unclear from which the electric potential of the readout signal line 407 is raised.

However, in the case where the signal line electric potential maintenance section 440 is in an on state and the column selection signal CSEL is turned on, the electric potential of the readout signal line is not drawn by the constant current source load 411, and the electric potential of the readout signal line 407 rises from the first electric potential Vs0 and the electric potential of the FD section 403 also rises due to the coupled capacitance C2. As a result, the electric potential FD0 of the FD section 403 can be a voltage Vh, which is greater than the power supply voltage Vd.

When the transfer transistor 402 is turned on to transfer a signal charge accumulated in the light receiving section 401 to the FD section 403 at the time t5, the electric potential FD0 of the FD section 403 decreases, and so does the electric potential Vout of the readout signal line 407. At this time, because the electric potential FD0 of the FD section is greater than the power supply voltage Vd, a complete transferring of the signal charge can be easily performed.

The transfer transistor 402 is turned off at time t6 and the signal level Vsig is again taken into a circuit in the next step. The circuit in the next step outputs the difference between the reset level and the signal level as a pixel signal.

When the level of the reset gate wiring RST0 is changed from the low level to the high level at time t7, the electric potential FD0 of the FD section becomes the power supply voltage Vd. Further, when the level of the reset drain wiring Vr0 is turned to the low level at time t8, the electric potential FD0 of the FD section 403 turns to be VL and at a low reset level.

The signal line electric potential maintenance section 440 is turned on at time t9, and the column selection signal CSEL falls at time t10, so that the electric potential of the readout signal line 407 becomes the electric potential Vs0.

Thus, according to Embodiment 1, the pixels 410 and 450 are configured with a 3TR structure respectively including the reset transistors 404 and 454 for resetting an electric potential of the signal charge accumulation section 403, the transfer transistors 402 and 452 for transferring a signal charge generated in the light receiving section to the signal charge accumulation section 403, and the amplifying transistors 405 and 455 for amplifying the electric potential of the signal charge accumulation section 403 and 453 to output it to the readout signal line 407. In addition, the signal electric potential maintenance section 440 and the column selection section 420 are provided, the signal electric potential maintenance section 440 maintaining the electric potential of the readout signal line 407, which is used for reading out signal voltage from a reset voltage and a pixel, at the first electric potential, and the column selection section 420 being connected between the drain of the amplifying transistor 405 and the source of voltage. After the reset transistor is turned on and the electric potential of the signal charge accumulation section is reset, the reset transistor is turned off and the column selection section 420 is operated so as to raise the readout signal line to the second electric potential, which is greater than the first electric potential. Then, the reset voltage of the signal charge accumulation section, which is decreased due to the turning off of the reset transistor, can be increased by the rise of the voltage of the readout signal line and the coupled capacitance of the readout signal line and the signal charge accumulation section. Accordingly, it is feasible to raise the electric potential of the FD section in a pixel of a 3TR structure and to sufficiently secure the electric potential difference between the photoelectric conversion element and the FD section. As a result, a solid-state image capturing apparatus, which easily performs a complete transferring (no afterimage) of a signal charge from the photoelectric conversion element to the FD section and which is stable, is obtained.

In addition, the column selection section for supplying a second electric potential to the readout signal line 407, and the signal line electric potential maintenance section 440 for maintaining the electric potential of the readout signal line 407 at the first electric potential are provided, and as a result, the electric potential of the readout signal line can be changed from the first electric potential Vs0 to the second electric potential, which is higher than the first electric potential, by a simple operation of switching between the operation of the column selection section and the operation of the signal line electric potential maintenance section.

In addition, according to the present embodiment 1, the signal line electric potential maintenance section 440 is configured with a p-type transistor and an n-type transistor connected in series between the source of voltage and the ground connection, and the p-type transistor is on-off controlled by the selection signal line, and a constant bias voltage is applied for a gate of the n-type transistor at the ground connection side. As a result, the holding potential for the readout signal line is controllable by the bias voltage.

In addition, a transistor that configures a column selection section is an n-type conductive transistor, so that the transistor size can be decreased. In addition, transistor-on voltage, which is larger than the power supply voltage, is applied for the gate of the transistor, so that the power supply voltage, which is supplied to an amplifying transistor through the column selection section, is prevented from being decreased by threshold voltage of the amplifying transistor.

In addition, the electric potential of the readout signal changes from the first electric potential without fail because the operation of the signal electric potential maintenance section for setting the readout signal line to the first electric potential and the operation of the column selection section for setting the readout signal line to the second electric potential overlap with each other for a certain period of time when the electric potential of the readout signal line is changed from the first electric potential to the second electric potential.

In addition, the column selection section is configured to be a p-type transistor, so that voltage drop does not occur between the power supply voltage Vd and the wiring layer 430.

In addition, an unselected pixel is prevented from being selected during a read out of a selected pixel because the electric potential of the signal charge accumulation section of the unselected pixel is constantly maintained during a readout period of a signal charge from the selected pixel.

In addition, the amplifying transistor of the unselected pixel is completely turned off because the electric potential of the signal charge accumulation section of the unselected pixel is smaller than the sum of the first voltage and the threshold voltage of the amplifying transistor.

In Embodiment 1 described above, an n-type transistor is used as a transistor to configure the pixel, a p-type transistor is used as a transistor to configure the column selection section, and a p-type and an n-type transistors are respectively used as the transistor on the power source side and the transistor on the signal line side that configure the signal line electric potential maintenance section. However, transistors, the conductive type of which is reversed from the ones in the embodiment described above, may also be used as these transistors. In such a case, a negative power supply needs to be used as a power supply.

Embodiment 2

Figure 3:
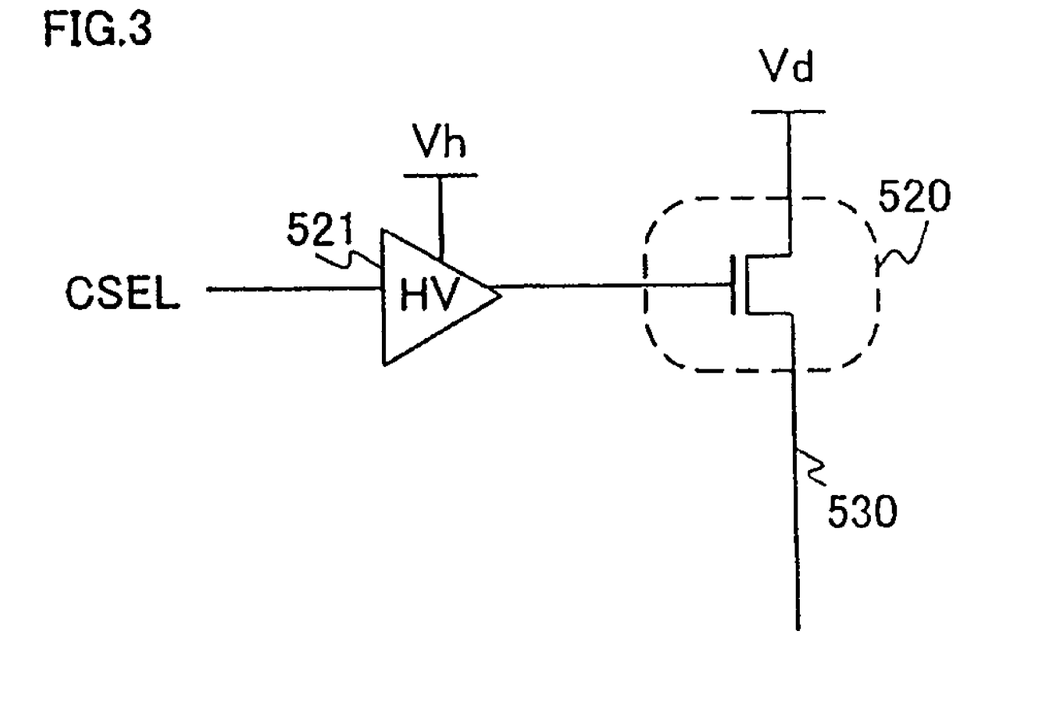
FIG. 3 is a diagram showing a three-transistor amplified solid-state image capturing apparatus according to Embodiment 2 of the present invention, showing a circuit structure of a column selection section.

FIG. 3 is a diagram showing a solid-state image capturing apparatus according to Embodiment 2 of the present invention.

A solid-state image capturing apparatus according to Embodiment 2 includes a column selection section 520, which is configured with an n-type transistor, and a level shifter 521 for level shifting a column selection signal CSEL given to the column selection section 520, instead of the column selection section 420 and the inverter 421 in the solid-state image capturing apparatus according to Embodiment 1, and the rest of the structure is the same as that of the solid-state image capturing apparatus according to Embodiment 1. Further, the reference numeral 530 in FIG. 3 is a wiring layer connected to a drain of an amplifying transistor in each pixel in one pixel row, corresponding to the wiring layer 430 according to Embodiment 1.

Next, a functional effect will be described.

In Embodiment 2, an n-type transistor is used in the column selection section 520. Therefore, when power supply voltage is given to a gate of the n-type transistor, voltage which appears at a drain of the amplifying transistor described above turns to be voltage that is dropped by Vth from the power supply voltage Vd. Because of this, a high voltage Vh, which is raised greater than the power supply voltage Vd by the level shifter 521, is applied to the gate of the transistor, minimizing the voltage drop of the voltage applied to the drain of the amplifying transistor of a pixel as much as possible.

Thus, according to the solid-state image capturing apparatus of Embodiment 2, the transistor that configures the column selection section is an n-type conductive transistor, so that the transistor size can be decreased. In addition, transistor-on voltage, which is larger than the power supply voltage, is applied for the gate of the transistor, so that the power supply voltage, which is supplied to an amplifying transistor through the column selection section, is prevented from being decreased by threshold voltage of the amplifying transistor.

Further, although not specifically described in Embodiment 1 or 2 described above, an electric information device will be described hereinafter. The electric information device, such as a digital camera (e.g., digital video camera and digital still camera), an image input camera, a scanner, a facsimile machine and a camera-equipped cell phone device, has an image capturing section using at least one of the solid-state image capturing apparatuses according to Embodiments 1 and 2 described above as an image input device.

Embodiment 3

Figure 8:
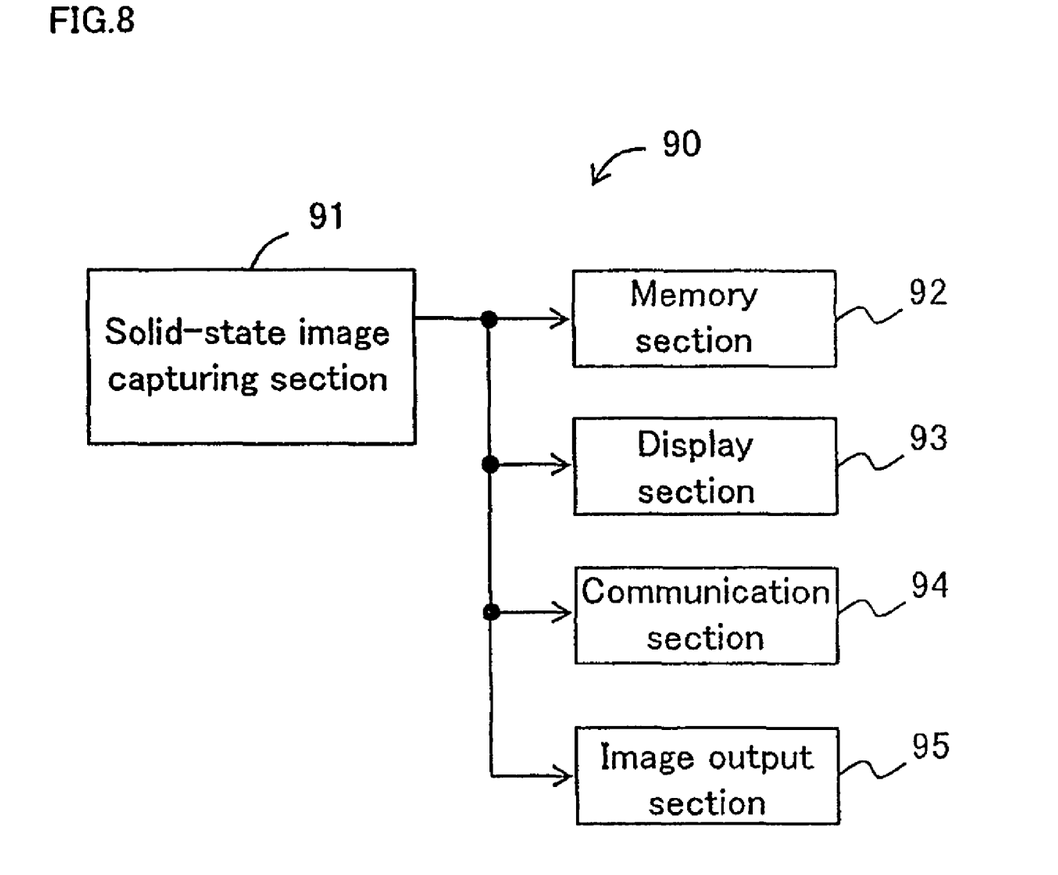
FIG. 8 is a block diagram showing an exemplary simplified structure of an electric information device using the solid-state image capturing apparatus according to Embodiment 1 or 2 as an image capturing section, as Embodiment 3 of the present invention.

FIG. 8 is a block diagram showing an exemplary simplified structure of an electric information device using the solid-state image capturing apparatus according to Embodiment 1 or 2 as an image capturing section, as Embodiment 3 of the present invention.

The electronic information device 90 according to Embodiment 3 of the present invention, which is shown in FIG. 8, includes at least any of: an image capturing section 91 using at least either of the solid-state image capturing apparatuses according to Embodiments 1 and 2; a memory section 92 (e.g., recording media) for data-recording a high-quality image data obtained by the image capturing section after a predetermined signal process is performed on the image dada for recording; a display section 93 (e.g., liquid crystal display device) for displaying this image data on a display screen (e.g., liquid crystal display screen) after a predetermined signal process is performed for display; a communication section 94 (e.g., transmitting and receiving device) for communicating this image data after a predetermined signal process is performed on the image data for communication; and an image output section 95 for printing (typing out) and outputting (printing out) this image data.

As described above, the present invention is exemplified by the use of its preferred Embodiments. However, the present invention should not be interpreted solely based on Embodiments described above. It is understood that the scope of the present invention should be interpreted solely based on the claims. It is also understood that those skilled in the art can implement equivalent scope of technology, based on the description of the present invention and common knowledge from the description of the detailed preferred Embodiments of the present invention. Furthermore, it is understood that any patent, any patent application and any references cited in the present specification should be incorporated by reference in the present specification in the same manner as the contents are specifically described therein.

INDUSTRIAL APPLICABILITY

In the field of a solid-state image capturing apparatus, which is used for a camera-equipped cell phone device, a digital still camera, a monitoring camera and the like, and in particular, in the field of an amplified solid-state image capturing apparatus with a pixel having an amplifying function, the present invention can provide a solid-state image capturing apparatus, which, upon transferring of a signal charge, sufficiently secures an electric potential difference between the signal voltage and the reset voltage, easily performs a complete transferring of the signal charge from the photoelectric conversion element to the signal charge accumulation section, and is stable. In addition, the present invention can provide an electric information device using such a solid-state image capturing apparatus.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A solid-state image capturing apparatus, the apparatus comprising:
   a plurality of pixels arranged in two dimensions; and
   a readout signal line for reading out a signal charge from each pixel in each pixel row, the readout signal line being provided for each pixel line,
   wherein each pixel has a circuit structure including a photoelectric conversion element for performing a photoelectric conversion on an incident light, a signal charge accumulation section for accumulating the signal charge obtained by the photoelectric conversion, a transfer transistor for transferring the signal charge from the photoelectric conversion element to the signal charge accumulation section, a reset transistor for resetting an electric potential of the signal charge accumulation section to a reference voltage, and an amplifying transistor for amplifying the electric potential of the signal charge accumulation section to readout the electric potential in the readout signal line, in which a source side is connected to the readout signal line and a gate is connected to the signal charge accumulation section,
   wherein the solid-state image capturing apparatus further comprises:
   an electric potential setting section for setting an electric potential of the readout signal line of a corresponding pixel row, the electric potential setting section being provided for each pixel row; and
   a control section for, in a state where the electric potential setting section is controlled to maintain the electric potential of the readout signal line at a first electric potential, turning on the reset transistor to reset the electric potential of the signal charge accumulation section to a reference voltage and subsequently turning off the reset transistor and simultaneously controlling the electric potential setting section to change the electric potential of the readout signal line to a second electric potential so as to change the electric potential of the signal charge accumulation section in a reverse direction from the electric potential change of the signal charge accumulation section due to the turning off of the reset transistor.

2. A solid-state image capturing apparatus according to claim 1,
   wherein the first electric potential is an electric potential between a power supply voltage and a ground connection voltage, and
   wherein the second electric potential is greater than the first electric potential.

3. A solid-state image capturing apparatus according to claim 2, wherein the electric potential setting section includes:
   a column selection section for supplying the second electric potential to the readout signal line through the amplifying transistor, the column selection section being connected between a wiring that commonly connects drains of amplifying transistors in pixels of each of the pixel row and a source of voltage; and
   a signal line electric potential maintenance section, which is provided for each pixel row, for maintaining the electric potential of the readout signal line of the corresponding pixel row at the first electric potential.

4. A solid-state image capturing apparatus according to claim 3, wherein the column selection section is configured with a column selection transistor connected between the source of voltage and the wiring that commonly connects the drains of the amplifying transistors, and a gate of the column selection transistor is connected to a column selection line, in which an electric potential is controlled by the control section.

5. A solid-state image capturing apparatus according to claim 3, wherein the signal line electric potential maintenance section is configured with a first conductive transistor and a second conductive transistor connected in series between the source of voltage and the ground connection, and a gate of the first conductive transistor on the side of the source of voltage is connected to a selection signal line for controlling an on-off operation of the transistor, and a constant bias voltage is applied for a gate of the second conductive transistor on the side of the ground connection.

6. A solid-state image capturing apparatus according to claim 1, wherein a selection of a pixel in the pixel row is performed by controlling an electric potential of the signal charge accumulation section of a pixel to be selected in the pixel row.

7. A solid-state image capturing apparatus according to claim 2, wherein the control section performs a selection of a pixel in the pixel row by turning on a reset transistor of a pixel to be selected in the pixel row as well as changing the electric potential of a reset drain wiring connected to a reset transistor of a pixel to be selected into a power supply electric potential.

8. A solid-state image capturing apparatus according to claim 7, wherein the control section turns on the transfer transistor after performing a selection of a pixel in the pixel row so as to transfer the signal charge generated in the photoelectric conversion element to the signal charge accumulation section of the selected pixel.

9. A solid-state image capturing apparatus according to claim 1, wherein the photoelectric conversion element is a buried photodiode.

10. A solid-state image capturing apparatus according to claim 1, wherein the electric potential setting section includes:
    a column selection section, which is connected between a wiring that commonly connects drains of amplifying transistors in pixels of each of the pixel row and a source of voltage, for supplying the second electric potential to the readout signal line through the amplifying transistor; and a signal line electric potential maintenance section, which is provided for each pixel row, for maintaining the electric potential of the corresponding readout signal line at the first electric potential, wherein, before transferring the signal charge from the photoelectric conversion element to the signal charge accumulation section, in a state where the signal line electric potential maintenance section is turned on and the electric potential of the readout signal line is maintained at the first electric potential, the control section turns on a reset transistor of a selected pixel in the pixel row for a predetermined period of time and resets the signal charge accumulation section of the selected pixel in such a manner that the electric potential of the signal charge accumulation section becomes greater than the electric potential of each signal charge accumulation section in each unselected pixel.

11. A solid-state image capturing apparatus according to claim 10, wherein after resetting the electric potential of the signal charge accumulation section in the selected pixel, the control section controls the column selection section and the signal line electric potential maintenance section to raise the electric potential of the signal charge accumulation section greater than the electric potential immediately after the resetting, in such a manner that the electric potential of the readout signal line becomes the second electric potential, which is greater than the first electric potential.

12. A solid-state image capturing apparatus according to claim 11, wherein the column selection section is configured with a column selection transistor whose conductivity is different from the amplifying transistor.

13. A solid-state image capturing apparatus according to claim 12, including an inverter that reverses a column selection signal provided from the control section, and applying an output of the inverter for a gate of the column selection transistor.

14. A solid-state image capturing apparatus according to claim 11, wherein a transistor that configures the column selection section is an n-type conductive column selection transistor, and a transistor-on voltage, which is greater than the power supply voltage, is applied for a gate of the n-type conductive column selection transistor.

15. A solid-state image capturing apparatus according to claim 14, including a level shifter for level-shifting a high-level electric potential of a column selection signal provided from the control section to a voltage higher than the power supply voltage, and applying an output of the level shifter for a gate of the column selection transistor.

16. A solid-state image capturing apparatus according to claim 11, wherein the electric potential of the readout signal line is changed from the first electric potential to the second electric potential at the resetting time of the signal charge accumulation section while an electric potential difference between the electric potential of the signal charge accumulation section and the electric potential of the readout signal line is maintained at a predetermined value.

17. A solid-state image capturing apparatus according to claim 11, wherein the control section controls the signal line electric potential maintenance section and the column selection section so that the signal line electric potential maintenance section and the column selection section are turned on together for a certain period of time at the resetting time of the signal charge accumulation section.

18. A solid-state image capturing apparatus according to claim 11, wherein the reset transistor is a depletion-type MOS transistor.

19. A solid-state image capturing apparatus according to claim 11, wherein the electric potential of the signal charge accumulation section of the unselected pixel is kept constant during a readout period of a signal charge from the selected pixel.

20. A solid-state image capturing apparatus according to claim 11, wherein the electric potential of the signal charge accumulation section of the unselected pixel is smaller than the sum of the first voltage and threshold voltage of the amplifying transistor.

21. An electric information device using the solid-state image capturing apparatus according to claim 1 as an image capturing section.

* * * * *